(12) United States Patent  
Shi

(10) Patent No.: US 8,879,262 B2  
(45) Date of Patent: Nov. 4, 2014

(54) COOLING DEVICE FOR PLUGGABLE MODULE, ASSEMBLY OF THE COOLING DEVICE AND THE PLUGGABLE MODULE

(75) Inventor: Kris Shi, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 209 days.

(21) Appl. No.: 13/634,958

(22) PCT Filed: Mar. 29, 2010

(86) PCT No.: PCT/CN2010/000393  
§ 371 (c)(1),  
(2), (4) Date: Sep. 14, 2012

(87) PCT Pub. No.: WO2011/120188  
PCT Pub. Date: Oct. 6, 2011

(65) Prior Publication Data  
US 2013/0000865 A1    Jan. 3, 2013

(51) Int. Cl.  
F28F 21/00    (2006.01)  
F28F 9/007    (2006.01)  
G02B 6/42    (2006.01)  
H05K 7/20    (2006.01)  
G01F 1/20    (2006.01)

(52) U.S. Cl.  
CPC .............. *G02B 6/4246* (2013.01); *G02B 6/428* (2013.01)  
USPC ...... 361/704; 361/679.54; 361/707; 361/715; 361/719; 165/80.3; 165/104.33; 165/185; 385/88; 385/92

(58) Field of Classification Search  
CPC .............. H05K 7/20; H05K 9/00; G06F 1/20; F28F 7/00; G02B 6/36; G02B 6/4246; G02B 6/42; H04B 10/00; H01L 23/34  
USPC ...................... 361/679.46, 679.54, 690–697, 361/704–715, 717–724, 800, 801, 804, 816, 361/818; 165/80.2, 80.3, 104.33, 185; 257/713, 718, 719; 385/92–94, 88, 53; 398/141, 164, 135, 139, 117; 439/567, 439/607, 608, 609, 910, 637, 638, 607.2, 21  
See application file for complete search history.

(56) References Cited

U.S. PATENT DOCUMENTS 4,763,225 A    8/1988    Frenkel et al.  
6,980,437 B2    12/2005    Bright  
(Continued)

FOREIGN PATENT DOCUMENTS

CN    1674360 A    9/2005  
CN    101488610 A    7/2009  
(Continued)

*Primary Examiner* — Michail V Datskovskiy  
(74) *Attorney, Agent, or Firm* — Coats & Bennett, PLLC

(57) ABSTRACT

Provides a cooling device (100) for cooling at least one pluggable module (200) each having a pluggable component (20) and a frame (32) for accommodating the pluggable component, the frame having an opening (33) on a top wall thereof. The cooling device comprises at least one thermal conductive block (40), a heat radiator (70) and a resilient thermal conductive pad (60). The resilient thermal conductive pad being adapted to be in a substantially released position when the pluggable component is decoupled from the frame and substantially biased when the pluggable component is inserted into the frame thus exerting a biasing force on the thermal conductive block and the heat radiator whereby the thermal conductive block is pressed through the opening of the frame into direct thermal contact with the pluggable element of the pluggable module for conducting the heat generated by the pluggable component to the heat radiator through the thermal conductive block and the resilient thermal conductive pad. The main advantage of the cooling device is that the pluggable module has a reinforced and compact cooling structure that improves the heat dissipation efficiency.

14 Claims, 5 Drawing Sheets

(56) References Cited

U.S. PATENT DOCUMENTS

| | | | |
|---|---|---|---|
| 6,986,679 B1 * | 1/2006 | Aronson et al. | 439/374 |
| 7,145,773 B2 * | 12/2006 | Shearman et al. | 361/715 |
| 7,224,582 B1 * | 5/2007 | Saturley et al. | 361/679.54 |
| 7,229,221 B2 * | 6/2007 | Ahrens | 385/92 |
| 7,239,515 B2 * | 7/2007 | Bulman-Fleming et al. | 361/704 |
| 7,365,923 B2 * | 4/2008 | Hargis et al. | 359/820 |
| 7,405,931 B2 * | 7/2008 | Saturley et al. | 361/679.48 |
| 7,406,247 B2 | 7/2008 | Bench et al. | |
| 7,539,018 B2 | 5/2009 | Murr et al. | |
| 7,625,223 B1 * | 12/2009 | Fogg | 439/92 |
| 7,974,098 B2 * | 7/2011 | Oki et al. | 361/715 |
| 2003/0161108 A1 | 8/2003 | Bright et al. | |
| 2004/0105633 A1 * | 6/2004 | Ishikawa et al. | 385/92 |
| 2004/0151443 A1 | 8/2004 | Mizue | |
| 2005/0190540 A1 | 9/2005 | Shearman et al. | |
| 2005/0195565 A1 | 9/2005 | Bright | |
| 2005/0195571 A1 | 9/2005 | Bulman-Fleming et al. | |
| 2006/0176666 A1 * | 8/2006 | Saturley et al. | 361/687 |
| 2008/0232067 A1 | 9/2008 | Joiner et al. | |
| 2011/0317964 A1 | 12/2011 | Downs | |

FOREIGN PATENT DOCUMENTS

| | | |
|---|---|---|
| EP | 0213426 A1 | 3/1987 |
| TW | M309316 U | 4/2007 |

* cited by examiner

COOLING DEVICE FOR PLUGGABLE MODULE, ASSEMBLY OF THE COOLING DEVICE AND THE PLUGGABLE MODULE

BACKGROUND OF THE INVENTION

1. Field of the Invention

The present invention relates generally to a cooling device for cooling a pluggable module, and more particularly to a cooling device for a small form-factor pluggable (SFP) optical transceiver module.

2. Description of the Prior Art

Transceivers are utilized to interconnect circuit cards of communication links and other electronic modules or assemblies. Various international and industry standards define the type of connectors used to connect computers to external communication devices, such as modems, network connectors, and other transceivers. A well-known type of transceiver module known as Gigabit Connector Converter (GBIC) provides a connection between a computer and an Ethernet, Fiber Channel, or another data communication environment.

It is desirable to miniaturize transceivers in order to increase the port density at a network connection (at switch boxes, cabling patch panels, wiring closets, computer I/O, etc.). Small form-factor pluggable transceiver modules, such as 10-gigabit small form-factor pluggable (XFP) transceiver modules, were developed to meet this need. SFP transceivers are substantially less than one half the size of a GBIC transceiver, and transmit data transmission at higher rates, allowing higher aggregated data throughput in a communication system.

Referring to FIG. 8, the well-known pluggable transceiver module usually includes a pluggable component and a frame for accommodating the pluggable component therein. The frame is mounted on a circuit board. When inserted into the frame, the pluggable component will be mechanically and electrically connected with the circuit board.

For the sake of explanation, we will take an SFP transceiver module for example hereafter. Most commonly, the frame of the SFP transceiver module is a metal enclosure with front opening. FIG. 8 shows two sets of pluggable components and frames on a circuit board in which the right pluggable component is in a state before the pluggable component is inserted while the left pluggable component is in a state after the pluggable component is inserted. In operation, when the pluggable components are inserted, the heat generated by these components will be conducted to frame walls firstly, and then released to local air by the frame walls. There are usually some holes on top walls of the frames to improve heat convention and radiation. However, the pluggable component and frame are not well contacted. There is inevitably an air gap between the pluggable component and an inside surface of the frame, which blocks the heat conduction therebetween. Since there is a big thermal resistance for heat dissipation from frame to air, this solution only fits for an SFP transceiver module with small power consumption. With the data transfer rate growing, the power consumption of the pluggable module is increasing. It requires thermal solutions in many systems for such device. Furthermore, the module is pluggable, which requires a flexible cooling solution.

Referring to FIG. 9, a Taiwan Patent TW309316U, titled "SFP cage with heat sink", provides an improved thermal solution for an SFP transceiver module. Said module includes a pluggable component and a frame with top, bottom, rear and side walls. The top wall is centrally opened. A heat sink is mounted on the frame and extends through an opening on top wall of the frame. The heat sink is positioned to make a direct contact with the pluggable component. A clip is mounted over the heat sink and engaged with tabs on the side walls of the frame to retain it. Such an arrangement of the heat sink helps the heat generated from the pluggable component to release. Since the size of the heat sink is usually limited, under the condition of multiple pluggable modules assembling in one system, it usually requires an additional forced convection unit to enhance the heat dissipation efficiency, thus making the system relatively complex.

Accordingly, there is a need for an SFP transceiver module having a reinforced and compact cooling structure that improves the heat dissipation efficiency.

SUMMARY OF THE INVENTION

An object of the present invention is to provide a compact cooling device for cooling at least one pluggable module efficiently.

In order to achieve the above-described object, a cooling device for cooling at least one pluggable module is provided. The at least one pluggable module each has a pluggable component and a frame for accommodating the pluggable component. The frame has an opening on a top wall thereof. The cooling device comprises:

at least one thermal conductive block each configured to be thermally coupled to the respective pluggable module, a heat radiator for emitting the heat generated by the pluggable component of the pluggable module outward; and a resilient thermal conductive pad arranged between the thermal conductive block and the heat radiator; the resilient thermal conductive pad being adapted to be in a substantially released position when the pluggable component is decoupled from the frame and substantially biased when the pluggable component is inserted into the frame thus exerting a biasing force on the thermal conductive block and the heat radiator whereby the thermal conductive block is pressed through the opening of the frame into direct thermal contact with the pluggable element of the pluggable module for conducting the heat generated by the pluggable component to the heat radiator through the thermal conductive block and the resilient thermal conductive pad.

According to one aspect of the invention, a bracket is arranged between the thermal conductive block and the heat radiator to fix the thermal conductive block to the heat radiator through the resilient thermal conductive pad. The bracket comprises an aperture defined therein for holding the thermal conductive block and the resilient thermal conductive pad and two flanges at both sides thereof for fixing with the heat radiator. The bracket is preferably substantially U-shaped with a concave on the side of the aperture. The flanges of the bracket are fixed to the heat radiator by screws or rivets. The arrangement of the bracket has an advantage of fixing the thermal conductive block and the heat radiator integrally and compactly, thus further enhancing the heat dissipation property therebetween.

According to another aspect of the invention, the thermal conductive block has two side-protruding flanges at the top surface thereof which are configured to be held by the circumference of the aperture of the bracket. The thermal conductive block also has a peripheral surface and an engagement surface on the bottom surface thereof, said engagement surface is stepped with respect to the peripheral surface and can be extended through the opening of the frame for contacting the pluggable component when assembled. The engagement surface and the peripheral surface are configured to form one or two pairs of chamfers therebetween for facilitating plug-in or plug-out of the thermal conductive block from the opening of the frame.

According to still another aspect of the invention, when the pluggable component is not inserted into the frame, the peripheral surface of the thermal conductive block is contacted with the top wall of the frame by virtue of the resilience of the resilient thermal conductive pad.

Preferably, the resilient thermal conductive pad is made of silicon elastomer or graphite and the heat radiator is an enclosure of an electronics, a cooling plate or a heat sink and is made of heat conductive material.

The present invention also provides an assembly of the cooling device and at least one pluggable module and an electronic apparatus comprising the assembly.

Other objects, advantages, and novel features of the present invention will be apparent from the following detailed description of a preferred embodiment thereof with reference to the attached drawings, in which:

DETAILED DESCRIPTION OF THE PRESENT INVENTION

Figure 1:
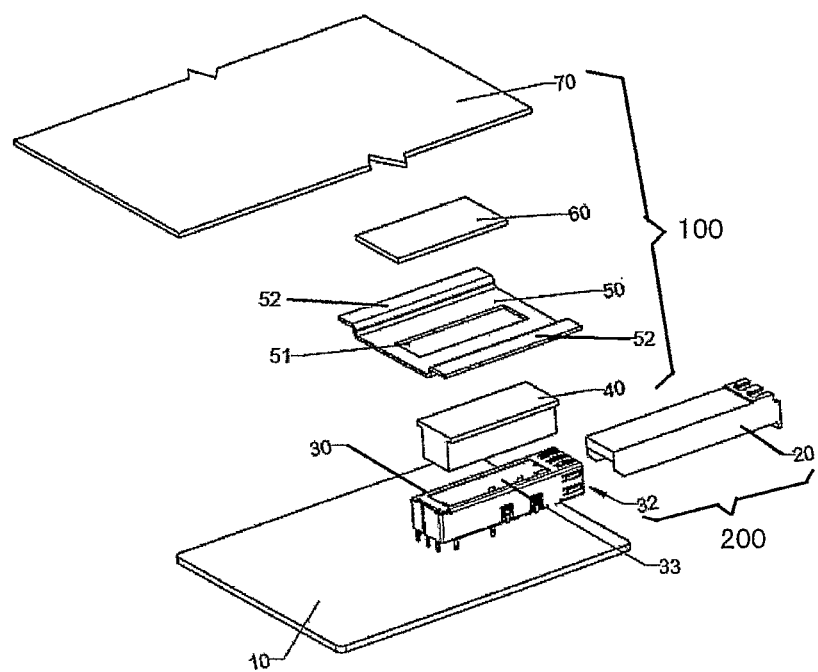
FIG. 1 is a schematic exploded perspective view of an assembly of a cooling device and a pluggable module adapted to be mounted on a PCB of an embodiment according to the present invention, the cooling device including a thermal conductive block, a bracket, a flexible thermal conductive pad and a heat radiator, and the pluggable module including a pluggable electronics and a frame for accommodating such a pluggable electronics.

FIG. 1 is a schematic exploded perspective view of an assembly of a cooling device 100 and a pluggable module 200 adapted to be mounted on a PCB 10 of an embodiment according to the present invention. The cooling device 100 includes a thermal conductive block 40, a bracket 50, a resilient thermal conductive pad 60 and a heat radiator 70. The pluggable module 200 includes a pluggable electronics 20 and a frame 32 for accommodating such a pluggable electronics 20.

The pluggable module 200 shown in FIG. 1 is an SFP optical transceiver module, but the pluggable module 200 can be any type of power consumption electronic module with a pluggable component. The metal frame 32 and a connector (not shown) are mounted on a circuit board 10. The metal frame 32 has a side opening (not labeled) to allow the pluggable component 20 to plug in. The connector is used to realize the connection between the pluggable module 200 and circuit board 10 mechanically and electrically. The frame 32 has a top wall 30 with a centered opening 33.

Figure 2:
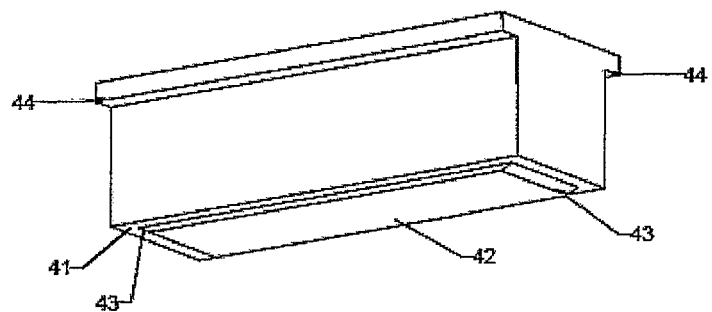
FIG. 2 is an enlarged perspective view of the thermal conductive block of FIG. 1.

Referring to FIG. 2, which is an enlarged perspective view of the thermal conductive block 40 of FIG. 1. The conduction block 40 over the top wall 30 of the frame 32 includes a peripheral surface 41 and an engagement surface 42 on a bottom surface thereof. The engagement surface 42 is stepped relative to the peripheral surface 41 and can be extended through the opening 33 of the frame 32. The engagement surface 42 and the peripheral surface 41 are configured to form one or two pairs of chamfers 43 therebetween for facilitating plug-in or plug-out of the pluggable module 200 from frame 31. The thermal conductive block 40 is made of heat conductive material and has two side-protruding flanges 44 at the top surface thereof which are configured to be held by the bracket 50.

Referring back to FIG. 1, the resilient thermal conductive pad 60 shown on the flange side of the thermal conductive block 40 can be made of silicon elastomer or graphite or other thermal conductive material that can be compressed.

The radiator 70 shown on the top of FIG. 1 is also heat conductive. It can be an enclosure of electronics, a cooling plate or a heat sink with fins. It usually has an extended area for emitting the heat generated by the pluggable component 20 of the pluggable module 200 outward.

The bracket 50 is arranged between the thermal conductive block 40 and the heat radiator 70 to fix the thermal conductive block 40 to the heat radiator 70 through the resilient thermal conductive pad 60. The bracket 50 includes two flanges 52 and an aperture 51. The two flanges 52 are arranged at both sides of the bracket 50 for fixing with the heat radiator 70 by screws or rivets and the aperture 51 is defined centrally in the bracket 50 for holding the thermal conductive block 40 and the resilient thermal conductive pad 60. The bracket 50 is substantially U-shaped with a concave on the side of the aperture 51.

Figure 3:
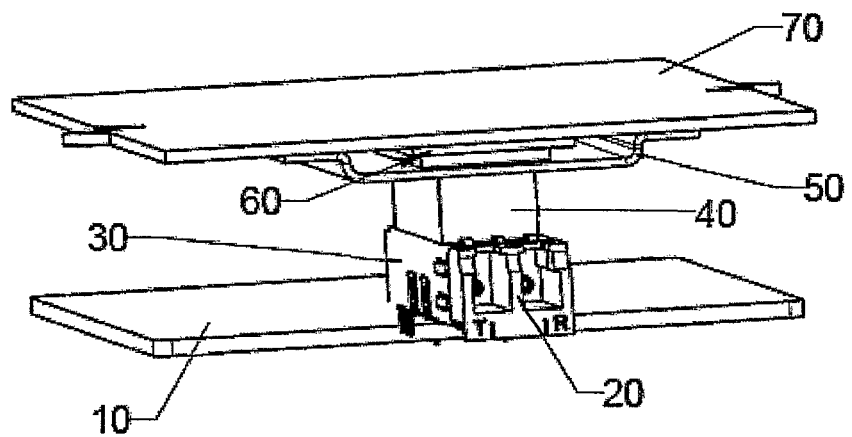
FIG. 3 is an assembled perspective view of the assembly of FIG. 1, but viewed from another side.
Figure 6:
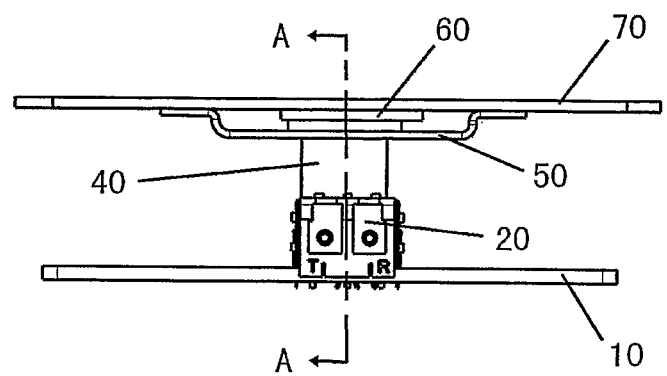
FIG. 6 is a schematic front elevation of FIG. 3.
Figure 7:
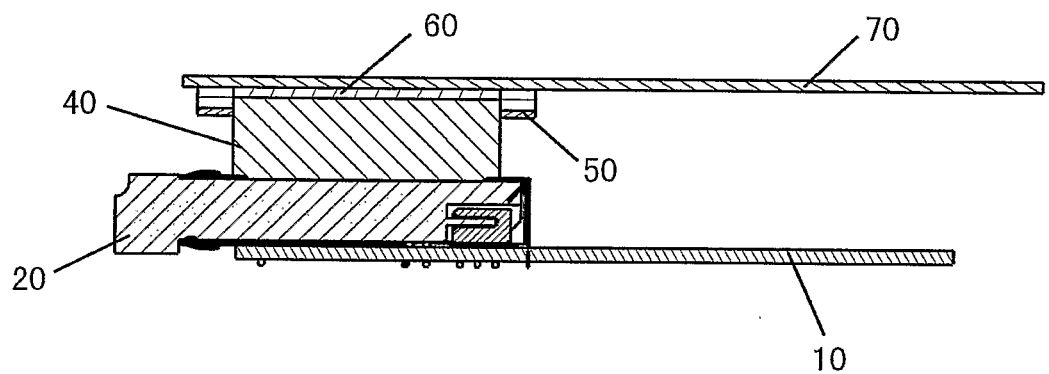
FIG. 7 is a cross sectional view of FIG. 6 taken along the line A-A, only showing a half part thereof.
Figure 8:
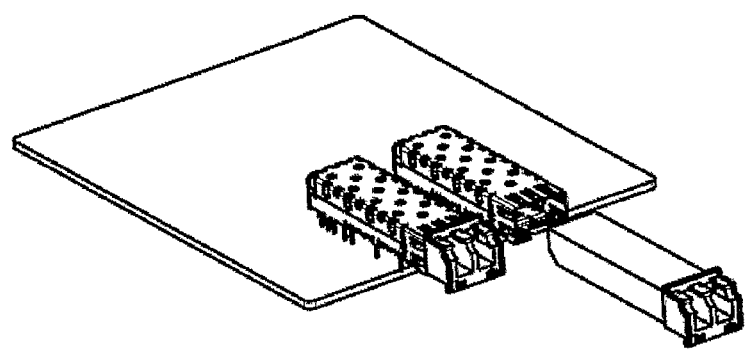
FIG. 8 is an exploded perspective view of a PCB and two pluggable modules ready to be mounted thereon according to the prior art.
Figure 9:
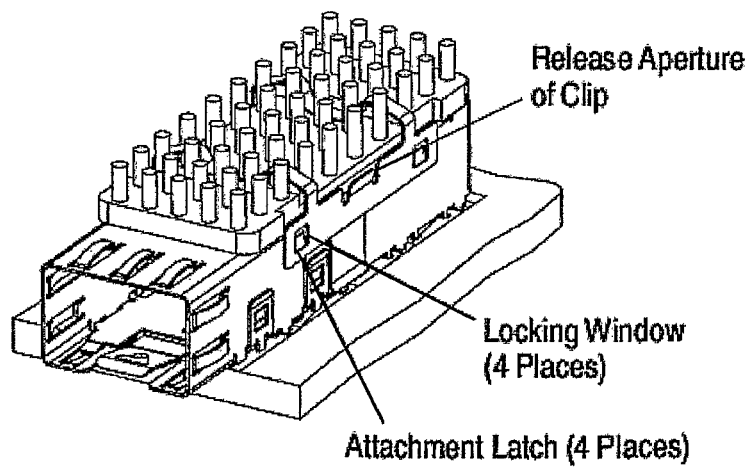
FIG. 9 is an assembled perspective view of a pluggable module mounted on a PCB and a conventional cooling device with heat sink for cooling the pluggable module.

Referring together to FIGS. 3, 6 and 7, in assembly and preparation to use the cooling device 100 with the pluggable module 200, the resilient thermal conductive pad 60 is fixed between the thermal conductive block 40 and the heat radiator 70. When the pluggable component 20 is decoupled from the frame 32 the resilient thermal conductive pad 60 is in a substantially released position, and when the pluggable component 20 is inserted into the frame 31 thus exerting a biasing force on the thermal conductive block 40 and the heat radiator 70 the resilient thermal conductive pad 60 is substantially biased, whereby the thermal conductive block 40 is pressed through the opening 33 of the frame 31 into direct thermal contact with the pluggable element 20 of the pluggable module 200 for conducting the heat generated by the pluggable component 20 to the heat radiator 70 through the thermal conductive block 40 and the resilient thermal conductive pad 60.

It should be noted that the terms "substantially released" as used herein might be appreciated as "free biased", "slightly biased" or "biased with a force which is lower than the force in the biased, i.e., coupled, state, thus exerting lower forces on the thermal conductive block 40 and the heat radiator 70 as in the coupled/biased position.

In operation, when the pluggable component 20 is not inserted into the frame 31, the peripheral surface 41 of the thermal conductive block 40 is contacted with the top wall 30 of the frame 31 by virtue of the resilience of the resilient thermal conductive pad 60, and when the pluggable component 2 is inserted into the frame 31, it will push the thermal conductive block 40 upward to compress the resilient thermal conductive pad 60 to contact with the heat radiator 70 such that counter forces from the resilient thermal conductive pad 60 and the heat radiator 70 can force the thermal conductive block 40 to contact with the pluggable component 20 of the pluggable module 200 compactly.

Figure 4:
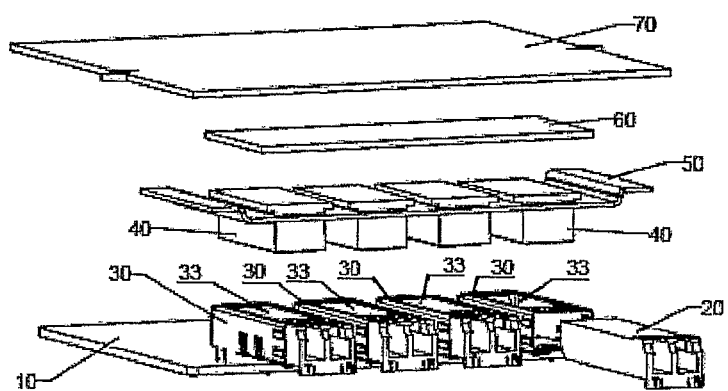
FIG. 4 is similar to FIG. 1, but showing the cooling device having multiple thermal conductive blocks for cooling multiple pluggable modules, respectively.
Figure 5:
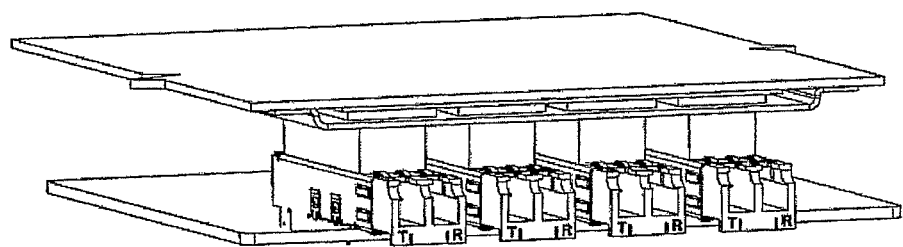
FIG. 5 is an assembled perspective view of FIG. 4.

FIGS. 4 and 5 show another embodiment of the present invention. The assembly according this embodiment includes four pluggable modules 200 mounted on a circuit board 10, a thermal conductive pad 60 and four thermal conductive blocks 40 for cooling the four pluggable modules 200, respectively, and a bracket 50 with four apertures 51 for holding the thermal conductive blocks 40 and the thermal conductive pad 60 and mounting with a big radiator 70. A flexible thermal conductive pad 60 is filled between the thermal conductive blocks 40 and the radiator 70. It is appreciated that the advantage of the invention may be embodied sufficiently with a greater number of pluggable modules 200. The greater the number of the pluggable modules 200 is the higher the heat dissipation efficiency of the assembly is. The other structural details and the internal assembling relationship of the components in FIGS. 4 and 5 are similar to those shown in FIGS. 1-3, 6 and 7.

The main advantage of this invention is that the pluggable modules 200 have a reinforced and compact cooling structure that improves the heat dissipation efficiency. In particular, the cooling device 100 includes a thermal conductive block 40 for conducting the heat out from the pluggable module 200. The thermal conductive block 40 is in direct thermal contact with the pluggable module 200 on one side, and attached to a big radiator 70 on the other side. A thermal conductive pad 60 is filled between the thermal conductive block 40 and the radiator 70. The pad 60 is compressive besides thermally conductive. When the pluggable component 2 is inserted into the frame 31, it will push the thermal conductive block 40 upward to compress the resilient thermal conductive pad 60 to contact with the heat radiator 70 such that counter forces from the resilient thermal conductive pad 60 and the heat radiator 70 can force the thermal conductive block 40 to contact with the pluggable component 20 of the pluggable module 200 compactly. Therefore, an enhanced heat transfer access from the pluggable module 200 to the radiator 70 is formed. The big radiator releases the heat generated by the transceiver module efficiently. In particularly, under the condition of natural convection cooling, the advantage will be more evident.

Thermal simulation has been done to compare the performance of the cooling device in present invention with the heat sink solution as shown in TW309316U. The outcome shows that the solution with the cooling device of this invention can improve the heat dissipation efficiency by about 44.31%.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, number, and arrangement of parts within the principles of the invention to the full extent indicated by the broad general meaning of the terms in which the appended claims are expressed.

I claim:

1. A cooling device for cooling at least one pluggable module, each pluggable module having a pluggable component and a frame for accommodating the pluggable component, the frame having an opening on a top wall thereof, the cooling device comprising:
  at least one thermal conductive block, each thermal conductive block configured to thermally couple to the respective pluggable module;
  a heat radiator for emitting heat generated by the pluggable component of the pluggable module outward; and
  a resilient thermal conductive pad arranged between the at least one thermal conductive block and the heat radiator; the resilient thermal conductive pad configured to be in a substantially released position when the pluggable component is decoupled from the frame, and to be substantially biased when the pluggable component is inserted into the frame thus exerting a biasing force on the thermal conductive block and the heat radiator whereby the thermal conductive block presses through the opening of the frame into direct thermal contact with the pluggable component of the pluggable module for conducting the heat generated by the pluggable component to the heat radiator through the thermal conductive block and the resilient thermal conductive pad.

2. The cooling device of claim 1, further comprising a bracket arranged between the thermal conductive block and the heat radiator to fix the thermal conductive block to the heat radiator through the resilient thermal conductive pad.

3. The cooling device of claim 2, wherein the bracket comprises:
  at least one aperture defined therein for holding the at least one thermal conductive block and the resilient thermal conductive pad; and
  two flanges at both sides thereof for attachment of the heat radiator.

4. The cooling device of claim 3, wherein the bracket is substantially concave shaped toward the heat radiator.

5. The cooling device of claim 3, wherein the flanges of the bracket are fixed to the heat radiator by screws or rivets.

6. The cooling device of claim 3, wherein each thermal conductive block comprises two side-protruding flanges at the top surface thereof which are configured to be held by the bracket proximate the circumference of the corresponding aperture.

7. The cooling device of claim 1:
  wherein the thermal conductive block has a peripheral surface and an engagement surface on the bottom surface thereof, the engagement surface being stepped with respect to the peripheral surface;
  wherein the engagement surface extends through the opening of the frame for contacting the pluggable component when assembled.

8. The cooling device of claim 7, wherein the engagement surface and the peripheral surface are configured to form one or two pairs of chamfers therebetween for facilitating plug-in or plug-out of the thermal conductive block from the opening of the frame.

9. The cooling device of claim 7, wherein, when the pluggable component is not inserted into the frame, the peripheral surface of the thermal conductive block is in contact with the top wall of the frame by virtue of the resilience of the resilient thermal conductive pad.

10. The cooling device of claim 1, wherein the resilient thermal conductive pad comprises a silicon elastomer or a graphite thermal conductive pad.

11. The cooling device of claim 1:
  wherein the heat radiator comprises one of:
    an enclosure of electronics;
    a cooling plate;
    a heat sink;
  wherein the heat radiator is made of heat conductive material.

12. The cooling device of claim 1, wherein the pluggable module comprises an optical transceiver module.

13. The cooling device of claim 12, wherein the optical transceiver module comprises a small form-factor pluggable optical transceiver module.

14. An electronic apparatus comprising:
- a processor configured to control the operation of the electronic apparatus; and
- an assembly of a cooling device for cooling at least one pluggable module, each pluggable module having a pluggable component and a frame for accommodating the pluggable component, the frame having an opening on a top wall thereof, the cooling device comprising:
  - at least one thermal conductive block, each thermal conductive block configured to thermally couple to the respective pluggable module;
  - a heat radiator for emitting heat generated by the pluggable component of the pluggable module outward; and
  - a resilient thermal conductive pad arranged between the at least one thermal conductive block and the heat radiator; the resilient thermal conductive pad configured to be in a substantially released position when the pluggable component is decoupled from the frame, and to be substantially biased when the pluggable component is inserted into the frame thus exerting a biasing force on the thermal conductive block and the heat radiator whereby the thermal conductive block presses through the opening of the frame into direct thermal contact with the pluggable component of the pluggable module for conducting the heat generated by the pluggable component to the heat radiator through the thermal conductive block and the resilient thermal conductive pad;
- wherein the frame comprises an opening on a top wall thereof for plugging in or plugging out of the corresponding thermal conductive block; and
- wherein each thermal conductive block is configured to thermally couple to the respective pluggable module.

* * * * *

UNITED STATES PATENT AND TRADEMARK OFFICE
CERTIFICATE OF CORRECTION

PATENT NO. : 8,879,262 B2
APPLICATION NO. : 13/634958
DATED : November 4, 2014
INVENTOR(S) : Shi It is certified that error appears in the above-identified patent and that said Letters Patent is hereby corrected as shown below:

In the Specification

In Column 1, Line 26, delete "(XFP)" and insert -- (SFP) --, therefor.

Signed and Sealed this
Twenty-third Day of June, 2015

Michelle K. Lee
*Director of the United States Patent and Trademark Office*